United States Patent [19]
Guerrini et al.

[11] Patent Number: 5,382,378
[45] Date of Patent: Jan. 17, 1995

[54] COMPOSITION USEFUL FOR TREATING SUSPENDED SOLIDS AND COLOR BODIES IN WATER SYSTEMS

[75] Inventors: Robert J. Guerrini, Aliquippa; Paul A. Rey, Corapolis, both of Pa.

[73] Assignee: Calgon Corporation, Pittsburgh, Pa.

[21] Appl. No.: 15,767

[22] Filed: Feb. 10, 1993

[51] Int. Cl.$^6$ ............................................. C02F 5/10
[52] U.S. Cl. ............................. 252/181; 252/180; 252/DIG. 8; 210/705; 210/727; 210/712
[58] Field of Search ......... 252/180, 181, 175, DIG. 8; 210/705, 712, 727

[56] References Cited

U.S. PATENT DOCUMENTS

| | | | |
|---|---|---|---|
| 2,345,543 | 3/1944 | Wohnsiedler et al. | 524/598 |
| 4,153,548 | 5/1979 | Forney | 210/728 |
| 4,629,572 | 12/1986 | Leitz et al. | 210/714 |
| 4,656,059 | 4/1987 | Mizuno et al. | 210/729 |
| 4,792,364 | 12/1988 | Huang | 252/175 |
| 4,863,615 | 9/1989 | Strenger et al. | 210/712 |
| 4,913,825 | 4/1990 | Mitchell | 210/705 |
| 4,929,382 | 5/1990 | Strenger et al. | 252/181 |
| 5,068,279 | 11/1991 | Morse | 524/593 |
| 5,116,514 | 5/1992 | Bhattacharyya | 210/712 |

OTHER PUBLICATIONS

Kirk–Othmer, Encyclopedia of Chemical Technology, Third Edition, vol. 20, Refractories to Silk, Silica (Amorphous), pp. 771, 772. (No Date).

*Primary Examiner*—Prince Willis, Jr.
*Assistant Examiner*—James M. Silbermann
*Attorney, Agent, or Firm*—Craig G. Cochenour; Catherine A. Dolan; Michael J. Kline

[57] ABSTRACT

A stable blended product comprising a melamine aldehyde, urea aldehyde or melamine-urea aldehyde and colloidal silica is useful as a detackifier for solvent-borne paints and other resinous materials. This product is also useful as a conditioning agent prior to collection of water-borne paints, a treatment for water containing oils or greases, a color-remover in natural waters, and for enhanced removal of suspended solids.

15 Claims, 4 Drawing Sheets

The Effect of pH on a Melamine Formaldehyde/Colloidal Silica Blend
(40/60 BlendRatio)

| pH | 1.5 | 2.0 | 3.0 | 3.25 | 3.5 | 4.0 |
|---|---|---|---|---|---|---|
| Day 1 | 4 | 4 | 6 | 240 | 320 | > 1,000 |
| Day 20 | 4 | 4 | 9 | > 1,000 | > 1,000 | > 1,000 |
| Day 27 | 4 | 4 | 75 | > 1,000 | > 1,000 | > 1,000 |
| Day 60 | 4 | 4 | 690 | > 1,000 | > 1,000 | > 1,000 |

The Effect of pH on Melamine Formaldehyde Acid Colloid Solution

The Effect of pH on Colloidal Silica Solution

The Effect of pH on a Melamine Formaldehyde/Colloidal Silica Blend
(40/60 BlendRatio)

Blends of Melamine Formaldehyde/Colloidal Silica
With Different Percentages of Melamine Formaldehyde, at pH 1.5

COMPOSITION USEFUL FOR TREATING SUSPENDED SOLIDS AND COLOR BODIES IN WATER SYSTEMS

BACKGROUND OF THE INVENTION

Melamine aldehyde, urea aldehyde, and melamine-urea aldehyde copolymer solutions are available in acid colloid form. These materials are meta-stable and are electrolyte sensitive. Known melamine aldehyde, urea aldehyde and melamine-urea aldehyde solutions including melamine formaldehyde solutions (MF solutions) are not stable above pH 4. In contrast, colloidal silica solutions (C.S. solutions) are not stable below pH 5. Thus, there is an apparent incompatibility in blending these products.

Although resins and gels of melamine formaldehyde and silica have been reported in the literature, resins and gels are not useful as paint detackifiers. Gel formation is generally associated with a significant drop in detackification coagulation or effectiveness.

MF solutions and colloidal silica have both been reported to be effective paint detackifiers. However, until the present invention, a single product blend was not available because of the different pH ranges where the two components, the MF solution and colloidal silica, are stable. U.S. Pat. No. 4,863,165 describes a method for paint detackification employing low molecular weight cationic polymers and silica. The related patent, U.S. Pat. No. 4,929,382, claims compositions of low molecular weight cationic polymers and silica. Notably absent from the claims and examples of U.S. Pat. No. 4,929,382 and U.S. Pat. No. 4,863,615 are the compositions wherein the low molecular weight cationic polymer is melamine formaldehyde, or other melamine aldehydes, urea aldehydes or melamine-urea aldehydes.

U.S. Pat. No. 4,863,615, discloses a method for treating pain kill waters comprising melamine formaldehyde and colloidal silica solution. However, the disclosure of U.S. Pat. No. 4,863,615 reveals that the melamine formaldehyde and the silica must be kept separate prior to being used in the system and fed separately into the system. The incompatibility of melamine formaldehyde and the related aldehydes with silica had precluded the formation of a single blend composition.

The present invention provides for stable blended compositions of melamine, urea, or melamine-urea aldehyde and colloidal silica; solutions formed of materials previously believed to be incompatible.

DESCRIPTION OF THE INVENTION

Figure 1:
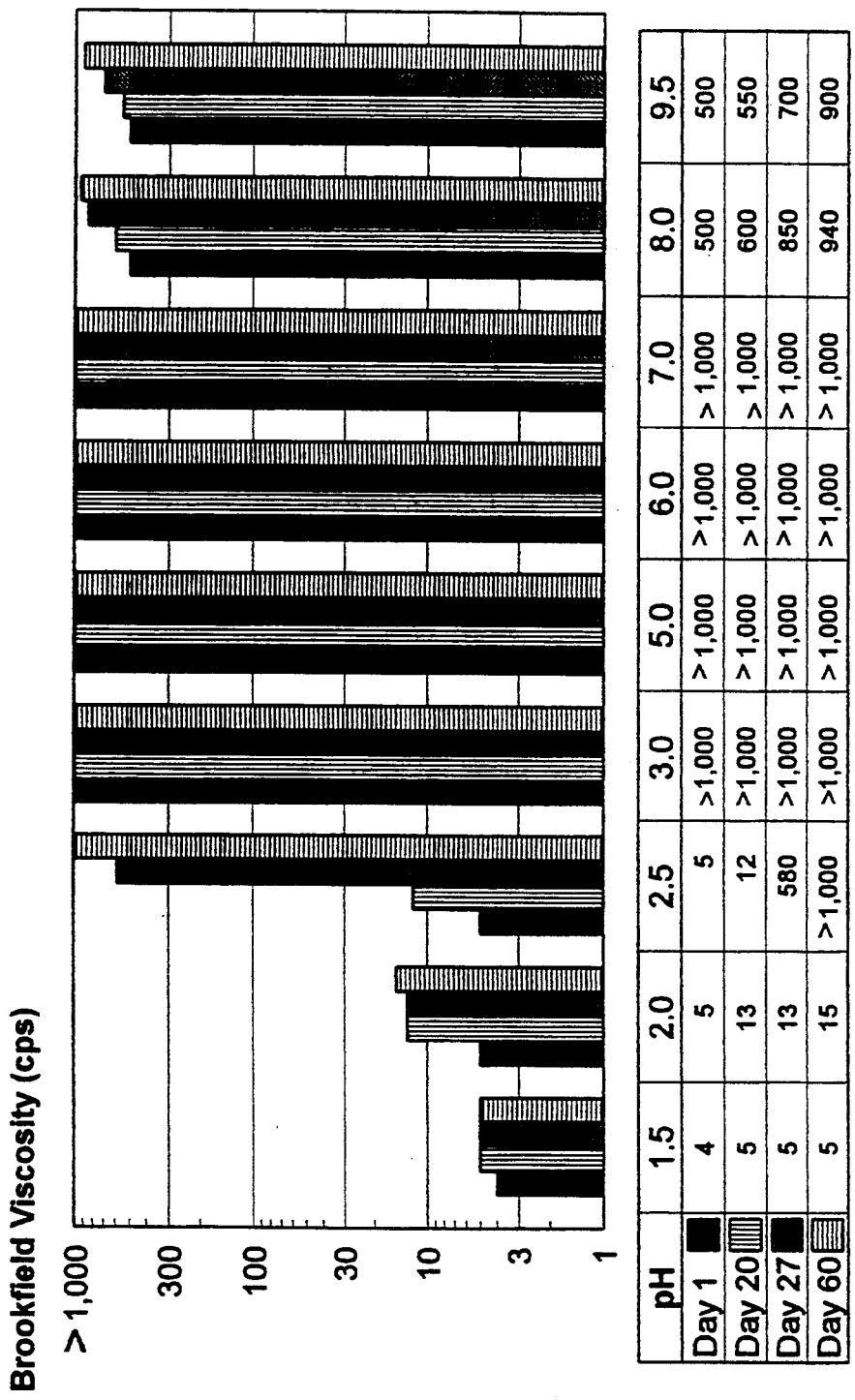
FIG. 1 is a bar graph of the effect of pH on product stability of the melamine formaldehyde acid colloid solution, described in Examples 1.

The present invention provides for stable blended compositions of melamine aldehyde, urea aldehyde, or melamine urea aldehyde and colloidal silica. The stable blended product of the present invention is free from precipitates and does not gel. The composition is useful as a detackifier for solvent-borne paints and other resinous materials. The composition is also useful as a conditioning agent prior to collection of water-borne paints, as a treatment for waters containing oils or greases, for color removal in natural waters and for enhanced removal of suspended solids in low solid waters. Melamine urea aldehyde copolymer solutions are acid colloids and as such are very unstable as shown in the phase diagrams in U.S. Pat. No. 2,485,079. The present invention provides for a set of conditions where two previously deemed incompatible materials can be combined to form a stable solution. The term "stable" refers to a physical state where the amino-resin and the silica gel retains its colloidal character and no precipitate or gel forms. The solution viscosity as determined by Brookfield viscosity is a convenient measurement of the physical nature of a material. A Brookfield viscosity of 1000 cps or lower indicates a stable solution. The present invention provides for a blend of melamine aldehyde, urea aldehyde or melamine-urea aldehyde and colloidal silica stable over a wider pH range than solutions of melamine aldehyde, urea-aldehyde, or melamine-urea aldehyde alone.

A silica sol is a stable dispersion of discrete, colloid-size particles of amorphous silica in aqueous solutions. Silica sols do not gel or settle even after several years of storage. Silica particles tend to grow during storage and the increased size adversely affects the sol stability. In general, silica sols may range from 10% to 50% $SiO_2$, and have particle sizes less than 1 micron with surface areas $>3$ m$^2$/g.

The stability of a silica sol depends on maintaining a high electrostatic repulsion between the silica particles. The pH must be alkaline, i.e., above pH 7, to maintain the negative charge on the silica particles to adequately prevent aggregation. Additionally, silica sols are only stable at low salt concentrations due to the effect of metal ions on the repulsive faces between the silica particles. In the low pH region, silica sols are meta-stable, and even small amounts of fluoride ion catalyzes gelling and aggregation. At low pH, water miscible solvents such as alcohol retard gelling; however, the higher the temperature and the higher the silica concentration of a sol, the more likely the sol is to gel.

Suitable silica sols for use in the composition of the present invention are colloidal silica sols having ultimate particle size of less than 1 micron, preferably 3 to 10 nm, and having 0.5% to 40% solids by weight, preferably 10% to 20%.

For the melamine aldehyde component, any melamine aldehyde-type polymer can be used. As used herein, a melamine aldehyde-type polymer is a polymer prepared using a) melamine or a substituted melamine; and b) an aldehyde having a formula

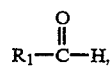

wherein $R_1$ is selected from the group consisting of straight and branched $C_{1-4}$alkyl. The preferred aldehydes are methanal (formaldehyde), ethanal and propanal; the most preferred aldehyde is formaldehyde.

The mole ratio of component a) to component b) should range from about 1:1 to about 1:10, with the preferred ratio being about 1:3 to 1:6. The most preferred mole ratio is about 1 mole of melamine or derivative thereof to about 3 mole of an aldehyde. Thus, the most preferred polymer is prepared from melamine and formaldehyde, and the mole ratio of melamine to formaldehyde is about 1:3.

The instant melamine aldehyde-type polymers are insoluble in water, but can be maintained in a colloidal suspension in acidic solutions. Any acid or compatible combination of acids can be used to prepare the melamine aldehyde acid suspensions, although hydrochloric acid is preferred. The active content of the melamine aldehyde-type polymer in acidic suspension or solution should range from about 0.1% to about 20%, preferably 1% to about 15%, and most preferably about 4% to about 12%. The pH should be sufficiently low to keep the melamine aldehyde-type polymer in a fine colloidal suspension.

The molecular weight of the melamine aldehyde-type polymer is not critical. However, the preferred molecular weight ranges from about 500 to about 50,000, and the most preferred molecular weight ranges from about 500 to about 5,000.

Urea aldehyde polymer solutions suitable for use in the present invention are those wherein aldehyde is defined as above, most preferably urea-formaldehyde copolymer solutions. The mole ratio of urea to aldehyde should range from 1:1 to 1:10 with the most preferred ratio being 1:3 to 1:6.

Melamine-urea aldehyde copolymer solutions, may also be favorably employed in the present invention. These solutions are prepared from an aldehyde component as defined above, urea, and melamine or a substituted melamine. Preferred are melamine-urea-formaldehyde copolymer solutions. The melamine-urea aldehyde-copolymer solutions suitable for use in the present invention contain 1 to 70 mole percent urea and 30 to 99 mole percent melamine and about 1 to 4 moles of aldehyde for each mole of combined melamine and urea in an acidic aqueous medium (for stability). The copolymer solution for use in the blended products of the present invention ranges from 0.1 to 20 percent solids, preferably 1 to 12 percent solids.

The compositions of the present invention are formulated by first lowering the pH of the colloidal silica solution to pH 1.0 to 2.5, preferably 1.3 to 1.5, with an aqueous mineral or organic acid. Suitable aqueous acids include: citric acid, acetic acid, nitric acid, phosphoric acid, sulfuric acid and hydrochloric acid, preferably hydrochloric acid or phosphoric acid. Hydrochloric acid is most preferred, since often melamine aldehyde urea aldehyde and melamine-urea aldehyde solutions solution contain hydrochloric acid. It should be noted that the suggested acids are not intended to limit the scope of the present invention and that combinations of the acids above may also be favorably employed.

The amino resin in acid colloid form is blended into the colloidal silica solution with stirring. The resultant blend should have a pH of 1.0 to 3.0, preferably, pH 1.5. Acid should be used to ensure the resultant blend is within the proper pH range. The amino resin and colloidal silica are blended in the range of 99.5:0.5 to 0.5:99.5. The final composition may range from 1.0 to 20 percent total solids.

Additional components such as linear, branched or polyhydric alcohols may be added to the solution to improve stability of the product solution.

The blended product is more versatile and convenient to use than the individual components. The blended product gives a faster reaction when applied to an operating system, such as to a paint spray booth system and, the use of the blended product results in both a better "kill" and a better capture of suspended paint droplets in solution. Product blends which have not been properly adjusted to the correct pH range experience a substantially shorter shelf life.

The following examples further illustrate the present invention. It should be understood, however, that these examples are given primarily for illustrative purposes and should not be construed as limitative.

The silica used in the following examples is Cab-O-Sperse II, an aqueous fumed silica dispersion containing 20% weight percent colloidal silica at pH 9.0–9.5, specific gravity 1.122, supplied by Cabot Corporation, Tuscola, Ill. 61953. The melamine formaldehyde used was 8% solids, and is commercially available from Calgon Corporation as PK-9511. Product stability as assessed using a Brookfield LVT viscometer manufactured by Brookfield Engineering Laboratories, Inc. Brookfield viscosity provides a measure of the flow character of the product.

EXAMPLES 1–3

Figure 2:
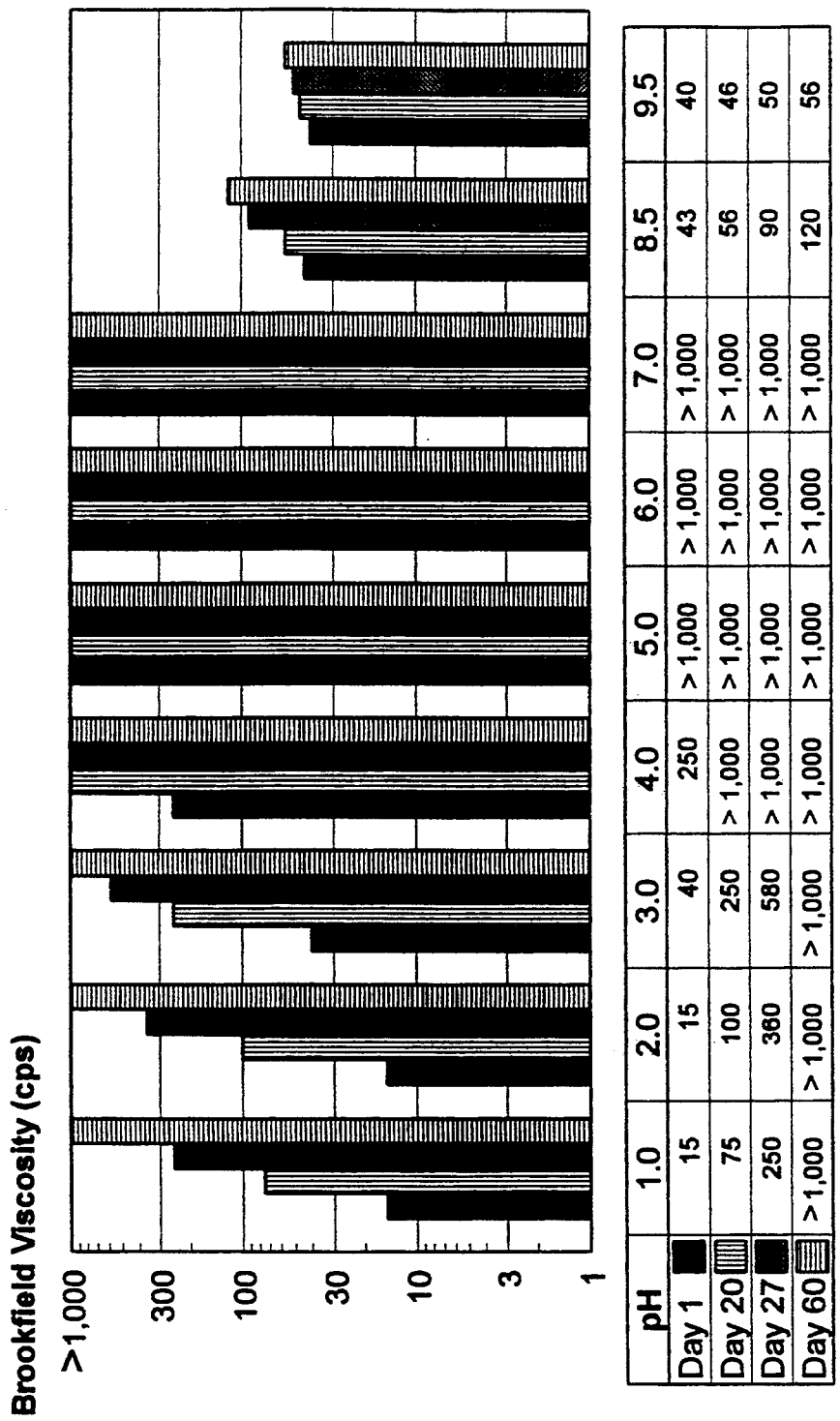
FIG. 2 is a bar graph of the effect of pH on the product stability of a colloidal silica solution, further described in Example 2.
Figure 3:
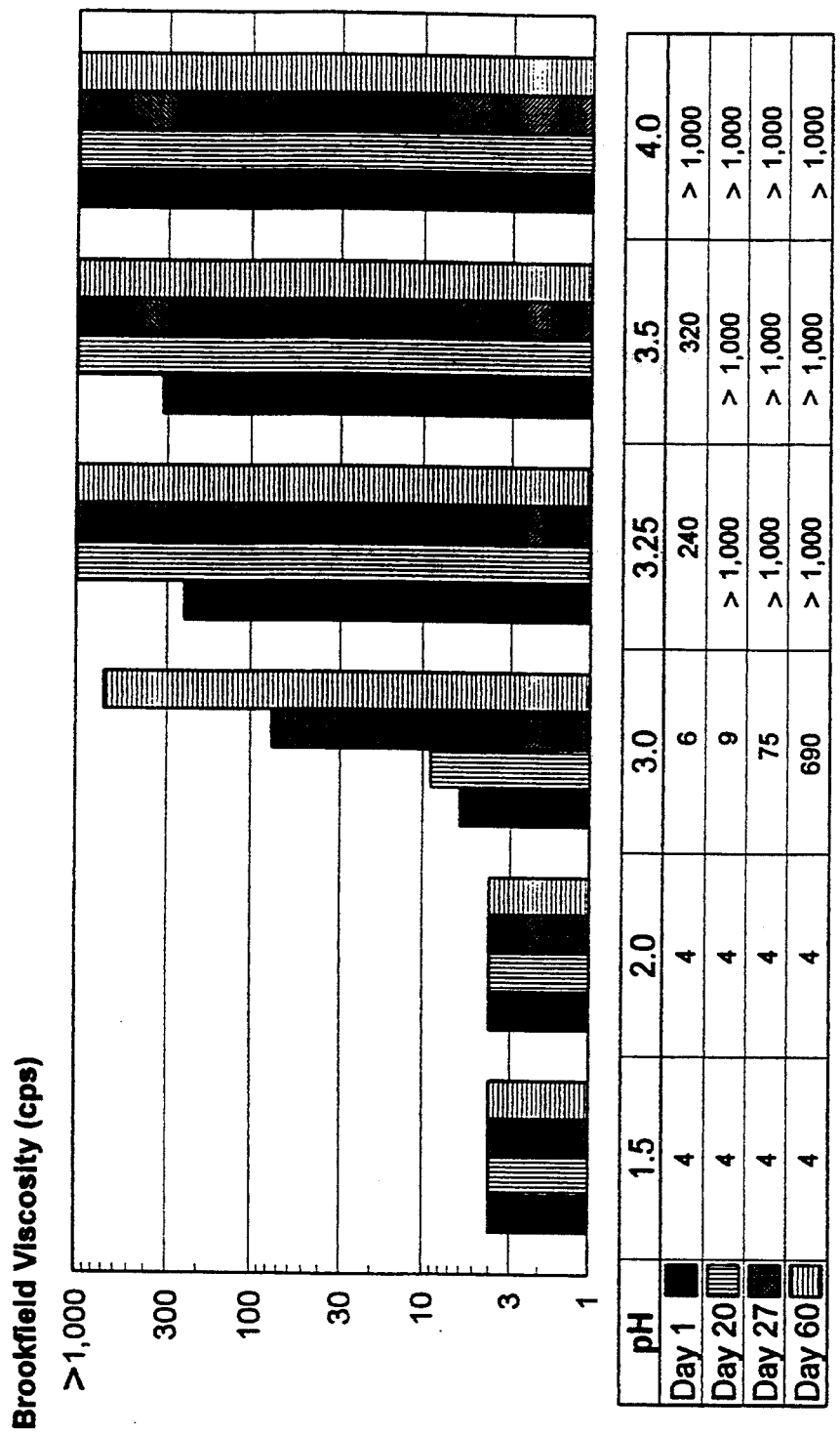
FIG. 3 is a bar graph of the effect of pH on a solution of a 40:60 Blend Ratio of Melamine Formaldehyde to colloidal silica, further described in Example 3.

Typically, colloidal silica and melamine formaldehyde acid colloid is only stable within a narrow pH range as illustrated in Example 1 (FIG. 1) and Example 2 (FIG. 2). In FIG. 1, it is observed that an M.F. colloidal solution is stable at pH <2.0, is meta-stable at pH 2–2.5, and destabilizes very rapidly above pH 2.5. In contrast, as shown in Example 2 (FIG. 2), the colloidal silica is stable at pH >9, immediately gels at pH <5. Example 3 (FIG. 3) illustrates, that within the defined range of pH disclosure in this invention, there is synergy between the M.F. and colloidal silica which produces a stable blended product. At a pH <3.0, the M.F./C.S. blend was stable (did not gel) while the C.S. alone demonstrated instability with time (refer to FIG. 2).

EXAMPLES 4–13

Examples 4–13 illustrate the preparation of blended products of the present invention with varying percentages of melamine formaldehyde and silica.

The blended products in the following Examples were prepared by adjusting the pH of colloidal silica to 1.5 with HCl. The melamine formaldehyde used was 8% solids, added in the form of PK-9511, a stable blended product of 8% melamine formaldehyde.

Figure 4:
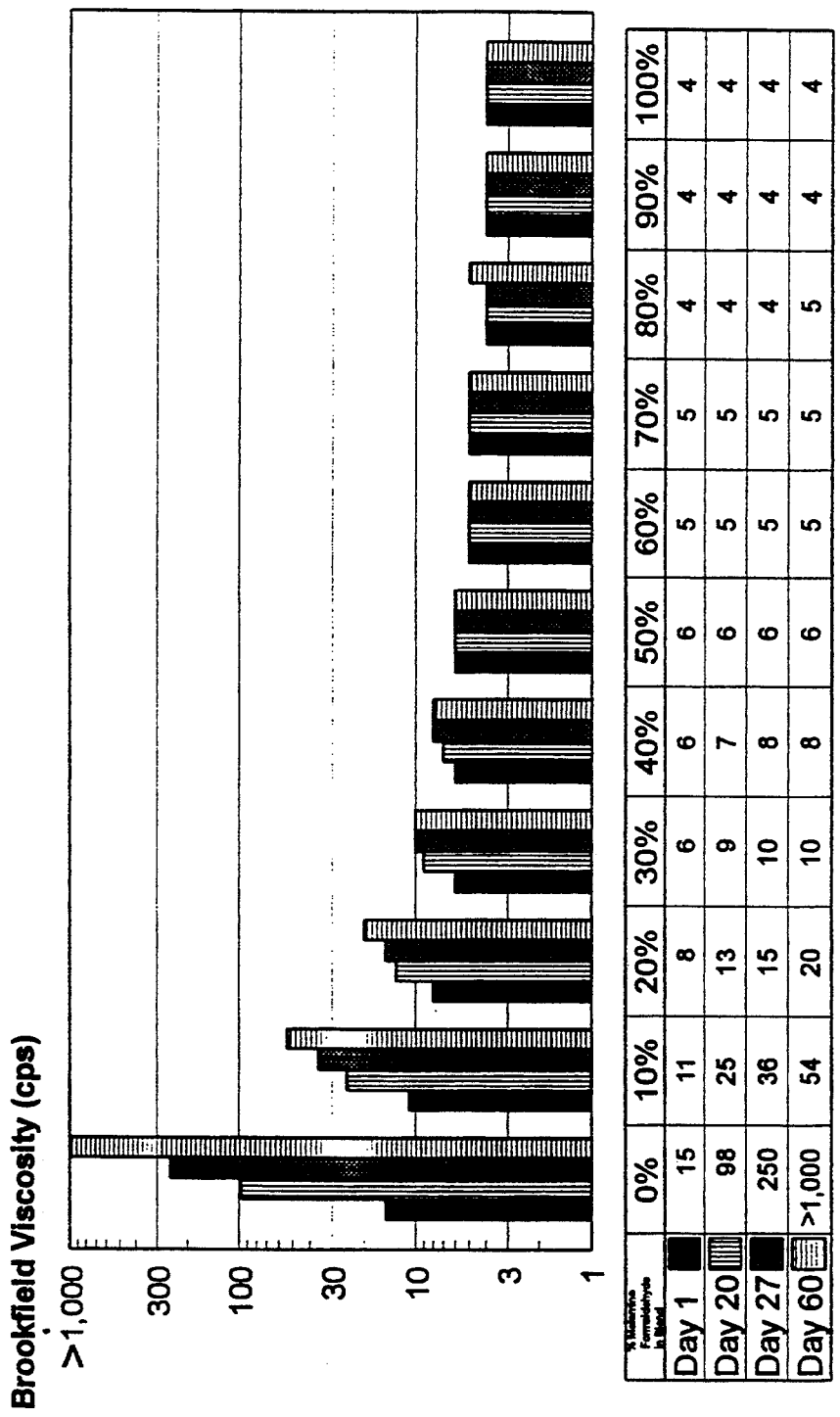
FIG. 4 is a bar graph of the effect of different blend ratios of melamine formaldehyde to colloidal silica at pH 1.5 on stability, as described in further detail in Example 4 to 13.

The melamine formaldehyde and the acidified colloidal silica were mixed in varying proportions as indicated in Table I. The stabilities of these blends are shown in FIG. 4. These blended products are stabled and free flowing.

TABLE I

| Example No. | PK-9511 (%) | Cab-O Sperse II | % MF (%) | Collodial Silica (%) | % MF/ Total Solids | Percent Solids |
|---|---|---|---|---|---|---|
| 4 | 100.0 | 0.0 | 8.0 | 0.0 | 100.0 | 8.0 |
| 5 | 22.0 | 78.0 | 1.8 | 15.6 | 10.1 | 17.4 |
| 6 | 38.0 | 62.0 | 3.0 | 12.4 | 19.7 | 15.4 |
| 7 | 52.0 | 48.0 | 4.2 | 9.6 | 30.2 | 13.8 |
| 8 | 63.0 | 37.0 | 5.0 | 7.4 | 40.5 | 12.4 |

TABLE I-continued

| Example No. | PK-9511 (%) | Cab-O Sperse II | % MF (%) | Collodial Silica (%) | % MF/ Total Solids | Percent Solids |
|---|---|---|---|---|---|---|
| 9  | 71.0 | 29.0 | 5.7 | 5.8 | 49.5 | 11.5 |
| 10 | 79.0 | 21.0 | 6.3 | 4.2 | 60.1 | 10.5 |
| 11 | 85.5 | 14.5 | 6.8 | 2.9 | 70.2 | 9.7 |
| 12 | 91.0 | 9.0  | 7.3 | 1.8 | 80.2 | 9.1 |
| 13 | 96.0 | 4.0  | 7.7 | 0.8 | 90.6 | 8.5 |

*Acidified to pH 1.5 with concentrated HCl
**PK-9511 = Melamine Formaldehyde, 8% solids
***Cab-O-Sperse II = Colloidal Silica, 20.0% solids

EXAMPLES 14–23

These examples illustrate the formulation of 8% total solid blended products from the samples prepared in Examples 1–10, above. The pH 1.5 acid water (with HCl) was used to dilute the samples to 8% total solids as shown in Table II.

TABLE II

| Example No. | Sample to Dilute | Sample (g) | Acid Water (g) | Total Weight (g) | % Solid | % MF | % PK-9511 |
|---|---|---|---|---|---|---|---|
| 14 | Example 1  | 50 | 0.0  | 50.0  | 8.0 | 8.0 | 100.0 |
| 15 | Example 2  | 50 | 58.5 | 108.5 | 8.0 | 0.8 | 10.1 |
| 16 | Example 3  | 50 | 46.5 | 96.5  | 8.0 | 1.6 | 19.7 |
| 17 | Example 4  | 50 | 36.0 | 86.0  | 8.0 | 2.4 | 30.2 |
| 18 | Example 5  | 50 | 27.8 | 77.8  | 8.0 | 3.2 | 40.5 |
| 19 | Example 6  | 50 | 21.8 | 71.8  | 8.0 | 4.0 | 49.5 |
| 20 | Example 7  | 50 | 15.8 | 65.8  | 8.0 | 4.8 | 60.1 |
| 21 | Example 8  | 50 | 10.9 | 60.9  | 8.0 | 5.6 | 70.2 |
| 22 | Example 9  | 50 | 6.8  | 56.8  | 8.0 | 6.4 | 80.2 |
| 23 | Example 10 | 50 | 3.0  | 53.0  | 8.0 | 7.2 | 90.6 |

What is claimed is:

1. A stable, blended composition, which comprises:
   (1) an aqueous solution of a water soluble polymer selected from the group consisting of a melamine aldehyde, melamine is substituted or unsubstituted; aldehyde is

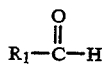

where $R_1$ is $C_{1-4}$ alkyl;

(2) a colloidal silica, wherein the polymer and colloidal silica are blended in the range of 99.5:0.5 to 0.5:99.5, respectively, on a total solids basis; and
   (3) an acid environment, resulting in said composition having a pH of 3.0 or less.

2. The composition according to claim 1 wherein aldehyde is selected from formaldehyde, ethanal and propanal.

3. The composition according to claim 2 wherein aldehyde is formaldehyde.

4. The composition according to claim 3 wherein the polymer is melamine-formaldehyde.

5. The composition according to claim 1 wherein the acidic environment is derived from the addition of an aqueous solution of
   (a) hydrochloric acid,
   (b) nitric acid,
   (c) phosphoric acid,
   (d) sulfuric acid,
   (e) acetic acid,
   (f) citric acid, or
   (g) a combination of two or more of the acids (a) through (f)

6. The composition according to claim 5 wherein the acid is hydrochloric acid or phosphoric acid.

7. The composition according to claim 1 additionally comprising a linear, branched or polyhydric alcohol.

8. The composition according to claim 1 additionally comprising formamide.

9. The composition according to claim 1 which comprises 0.5 to 60 percent total solids.

10. The composition according to claim 4 having 8% total solids wherein the acidic environment is aqueous hydrochloric acid at pH 1.5.

11. A method of forming a stable, blended composition of
   (a) an acid colloid comprising a colloidal suspension of a melamine aldehyde polymer in an acidic solution; and
   (b) a silica sol, comprising the steps of lowering the pH of said silica sol to pH 1.0 to 2.5, and blending said acid colloid into said silica sol, yielding a stable, blended composition having a pH of 3.0 or less.

12. The method of claim 11, further comprising the step of adding a linear, branched, or polyhydric alcohol to said blended composition.

13. The method of claim 11 wherein the step of lowering the pH of said silica sol lowers said pH to 1.3 to 1.5.

14. The method of claim 11 wherein said pH of said silica sol is lowered using an aqueous mineral or organic acid.

15. The method of claim 11 wherein said blending step is achieved by stirring.

* * * * *